United States Patent [19]
Yim

[11] 3,971,107
[45] July 27, 1976

[54] DEVICE FOR HOLDING FLEXIBLE MATERIAL

[76] Inventor: George Yim, 950 16th St., Ogden, Utah 84404

[22] Filed: Aug. 1, 1975

[21] Appl. No.: 601,029

[52] U.S. Cl. .............................. 24/243 K; 24/72.5
[51] Int. Cl.² .................. A44B 21/00; A47C 21/00
[58] Field of Search .......... 24/243 K, 72.5, 243 SP, 24/243 M, 243 N, 243 GC, 263 FC; 52/2; 160/368 R, 392

[56] References Cited
UNITED STATES PATENTS

| | | | |
|---|---|---|---|
| 600,852 | 3/1898 | Baisley | 24/243 M UX |
| 1,301,553 | 4/1919 | Garner | 24/72.5 X |
| 1,373,670 | 4/1921 | Plumb | 24/72.5 |
| 1,468,624 | 9/1923 | Bennett | 24/72.5 |
| 1,991,358 | 2/1935 | Bessy | 160/392 |
| 2,720,885 | 10/1955 | Legg | 160/392 X |
| 3,087,219 | 4/1963 | Roberts | 24/243 SP |
| 3,857,209 | 12/1974 | Milliken | 52/2 |

*Primary Examiner*—Donald A. Griffin
*Attorney, Agent, or Firm*—Mallinckrodt & Mallinckrodt

[57] ABSTRACT

A method of holding flexible sheet or strip material utilizes a holding device comprising a loop holder recessed internally to provide a polygonal passage for the reception of a loop-expanding element. A second, relatively shallow passage in the loop holder extends from and along the length of the polygonal passage to the outside of the loop holder for accommodating emergent portions of a received loop portion of flexible sheet or strip material to be held. The loop-expanding element is polygonal in configuration and of size adapted to be non-rotatively accommodated by the polygonal passage and is adapted for positioning within the loop portion of the flexible sheet or strip material to be held that is positioned within the polygonal passage.

9 Claims, 7 Drawing Figures

DEVICE FOR HOLDING FLEXIBLE MATERIAL

BACKGROUND OF THE INVENTION

1. Field

The invention is in the field of methods and devices for holding flexible sheet or strip material.

2. State of the Art

The most common way of holding flexible material is to provide the material with eyelets through which ropes and the like hold the material in place. In many materials, particularly plastic, eyelets are easily ripped out of the material, along with the holding ropes, when pressure is applied.

Conventional clamping devices are usually not designed to hold flexible material under load conditions, and some materials, particularly sheet plastics, easily slip through and out of the clamps.

SUMMARY OF THE INVENTION

According to the invention, flexible sheet or strip material to be held is looped to provide a portion for holding purposes. Such looped portion is then inserted into the holding device of the invention.

The holding device comprises a loop holder recessed internally to provide a polygonal passage for the reception of the looped portion of the flexible sheet or strip material to be held and of a polygonal, loop-expanding, insert element. A second, relatively shallow passage in the loop holder extends from and along the length of the polygonal passage to the outside of such loop holder for accommodating emergent portions of the received loop portion of the flexible sheet or strip material to be held. The polygonal, loop-expanding element is of size adapted to be non-rotatively accommodated by the polygonal passage and is inserted into the loop portion of the flexible sheet or strip material that is received by the polygonal passage, thereby expanding the loop and serving to hold it within the loop holder even when great pulling force is applied to the so-held sheet or strip material.

In a preferred embodiment, the loop holder comprises clamping jaws disposed in face-to-face relationship and having confronting faces configurated to provide the polygonal passage therebetween. Jaw face portions adjacent to the polygonal passage form the shallow passage, and means are provided for applying clamping pressure to the jaws so as to clamp either the loop portion and loop-expanding element in the recess or the emergent portions of the received material between the jaw faces or both.

In such preferred embodiment, the thickness of the loop-expanding element is preferably equal to the depth of the polygonal passage, so that the flexible sheet or strip material has clamping pressure applied to it both within the loop-receiving passage and within the second passage as the loop emerges from that first passage. This embodiment of the device will also work reasonably well if the thickness of the loop-expanding element is less than the depth of the polygonal loop-receiving passage so that clamping pressure is applied only by the jaw face portions of the clamping jaws, or if the thickness of such loop-expanding element is greater than the depth of the polygonal loop-receiving passage so that clamping pressure is applied only to the loop portion and loop-expanding element within the polygonal receiving passage.

THE DRAWING

The invention is specifically described with reference to the accompanying drawing, which illustrates the best mode presently contemplated of carrying out the invention.

In the drawings:

FIG. 1 is a perspective view of a device in accordance with the invention and shown holding a sheet of flexible material which is illustrated only fragmentarily;

FIG. 2, a vertical section taken on the line 2—2 of FIG. 1;

FIG. 3, a horizontal section taken on the line 3—3 of FIG. 1;

FIG. 4, an exploded assembly view of the device showing how the parts go together;

FIG. 5, a view similar to FIG. 2, but showing a differently dimensioned insert element;

FIG. 6, a similar view showing a still differently dimensioned insert element; and FIG. 7, a perspective view of a different embodiment of the device shown holding a strip of flexible material.

DETAILED DESCRIPTION OF THE ILLUSTRATED EMBODIMENT

Figure 1:
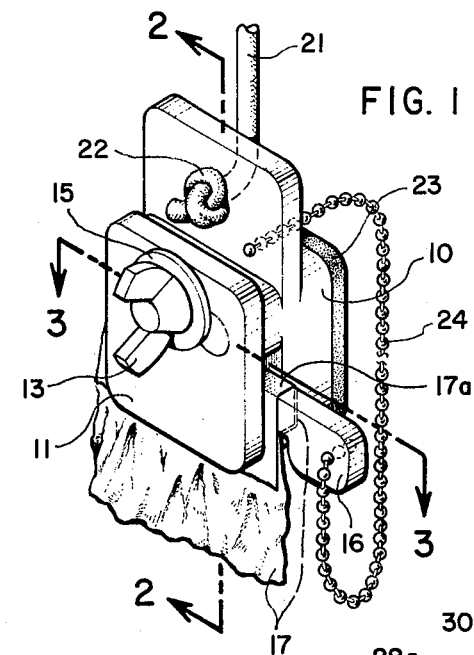

In the form illustrated by FIGS. 1 through 6, the holding device of the invention comprises a loop holder made up of separate clamping jaw members 10 and 11, preferably molded to shape from a suitable plastic. Jaw member 10 is recessed adjacent to a jaw face portion 10a to provide a polygonal passage 12 between it and the unrecessed, confronting face of jaw member 11.

Jaw member 11 is adapted to be urged toward jaw member 10 and to be tightened against face 10b thereof by a thumbscrew 13, serving as means for applying clamping pressure. Thumbscrew 13 extends through jaw member 11 and jaw member 10 into a threaded sleeve 14 embedded in jaw member 10. Sleeve 14 is provided if jaw member 10 is made of a material, such as some plastics, requiring reinforcement of the threads, and is made of metal or other sufficiently strong material. Otherwise, thumbscrew 13 may be threaded directly into the material of jaw member 10. As shown, a washer 15 is positioned between the head of thumbscrew 13 and jaw member 11.

A loop-expanding element 16 of polygonal configuration is adapted to be positioned within the passage 12 following reception by such passage of a loop portion of the flexible sheet or strip material to be held.

A sheet of flexible material 17 to be held by the device has a portion thereof folded back on itself as a loop (see 17a) and has the loop portion inserted into passage 12 by passing it through a relatively shallow passage 17-1 formed between jaw face 10a and the confronting jaw face portion 11a of jaw member 11. Passage 17-1 extends from and along passage 12 to the exterior of the loop holder. Loop-expanding element 16 is inserted into the closed end of loop 17a in passage 12, and the portions of flexible material 17 that form the open end of the loop emerge from the loop holder through shallow passage 17-1.

Jaw members 10 and 11 need not be clamped tightly together in order to hold the sheet material 17 securely. They need only be tightened sufficiently so that loop 17a, with its loop-expanding element 16, cannot be pulled out between jaw faces 10a and 11a and so that element 16 cannot completely rotate within the passage. Rocking movement short of rotation may be undesirable in some instances, but securement is not impaired.

Because of the polygonal character of passage 12 and loop-expanding element 16, rotation of the latter cannot take place and looped portion 17a of the held material cannot be pulled free. Thus, an important feature of the invention is that both the loop-receiving passage and the loop-expanding element are configured so that the latter is prevented from rotating. Although some movement of the insert is allowable, free rotation is not. A cylindrical insert cannot be used even if the sheet or strip material is clamped about it, for it can slip under load. Moreover, if the loop-expanding element is so much smaller than the loop-receiving passage that it can freely rotate within such passage, there is no holding action.

Figure 2:
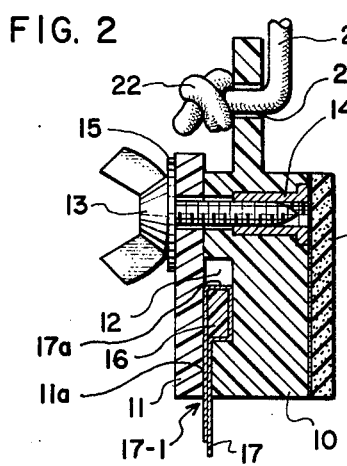
Figure 3:
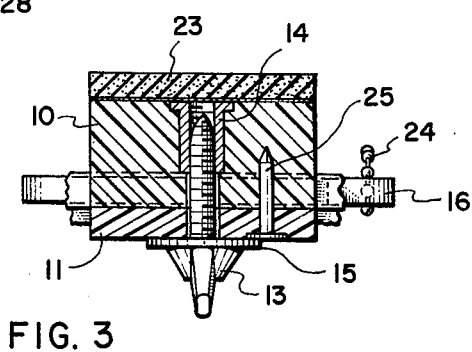
Figure 4:
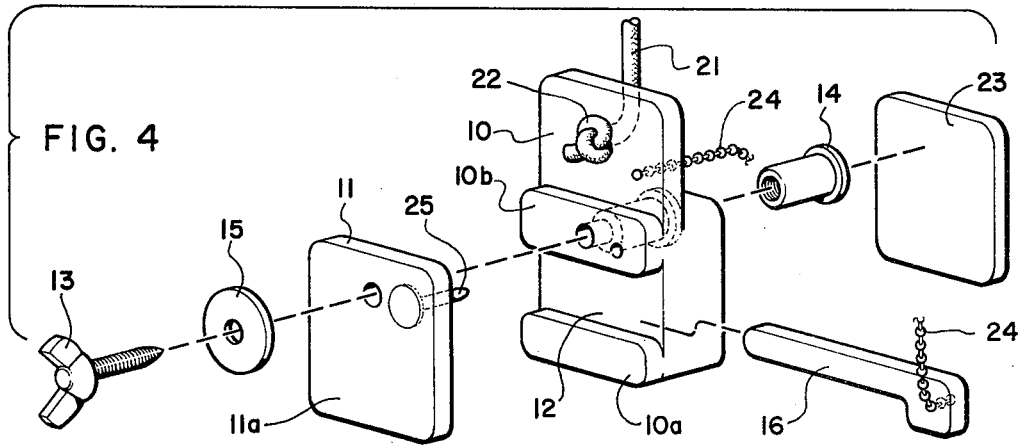

In the embodiment of FIGS. 1-6, thumbscrew 13 is used to urge jaw members 10 and 11 together. The preferred situation upon tightening the jaw members is illustrated in FIG. 2 where the insert element 16 is shown as being equal in thickness to the depth of passage 12. Clamping pressure is applied by jaw members 10 and 11 to the held material between jaw faces 10a and 11a and to the loop portion of the held material within receiving passage 12.

Figure 5:
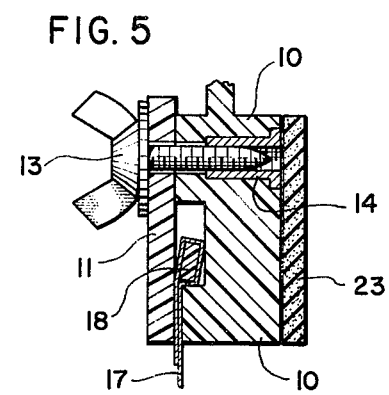

FIG. 5 shows the situation upon tightening the jaw members 10 and 11 in instances in which a thinner loop-expanding element 18 is used. Since the thickness of such element 18 is less than the depth of recess 12, clamping pressure is applied to the held material only between jaw faces 10a and 11a. Since the applied clamping pressure alone cannot keep smooth and slippery materials, such as many plastics, from slipping, insert element 18 will rock to the position shown when load is applied.

Figure 6:
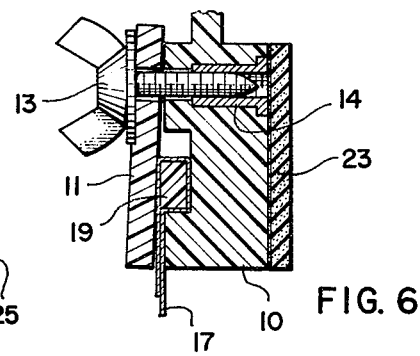

FIG. 6 shows the situation upon tightening the jaw members 10 and 11 in instances in which a loop-expanding element 19, of thickness greater than the depth of recess 12, is used. Clamping pressure is applied to the loop portion of the held material within receiving passage 12.

It is preferred, as in the illustrated embodiments, to have some clamping action present along with the holding action of the insert, because the clamping action tends to spread the load and stress on the held material over a larger portion of the material. For example, with the preferred arrangement as shown in FIG. 2, holding force is spread over the entire area of material within the jaw members and recess, whereas, if the jaw members are loosened, the holding force is concentrated at opposite corners of the insert element.

Another advantage gained by applying clamping pressure between the jaw members is that under conditions of alternating load or no load on the held material and under conditions in which the material and holding device may be jerked from time to time, all elements of the device are held together as a unit. This means that the material and loop-expanding element are held tightly in the device under no load and under changing load conditions such as jerking which could otherwise cause incremental slippage.

To provide a convenient means of anchoring the device, a hole 20 is provided in jaw member 10 and a cord 21 having a knotted end 22 is passed therethrough. In this way, the device may be attached to the flexible material and then tied down. This is particularly useful in covering an object, such as a car or boat, or covering a load in a truck. In such instances, several of the holding devices are attached to plastic sheeting material and the devices then tied down in the manner of a conventional tarp or cover. Since the holding devices may be attached to such sheeting material at any desired location, it is not necessary that the material be sized particularly for what is to be covered. Cord 21 is also useful for carrying a loaded plastic or other type bag to which the holding device may be attached.

Cushioning material 23 is advantageously glued to the back of jaw member 10, so that the device will not scratch surfaces against which it may be secured, and a chain 24 may be provided to attach insert element 16 to jaw member 10 for ensuring its ready availability and preventing its loss. Also, it is advantageous that a pin 25 be provided to keep jaw member 11 aligned with jaw member 10.

Although the holding device is shown in the preferred embodiment as comprising clamping jaws which can apply clamping pressure to the held material, it is clear from the foregoing description of the invention that the clamping action is not necessary.

Figure 7:
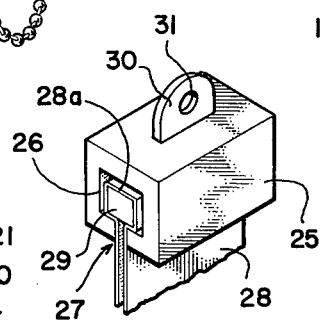

FIG. 7 illustrates an embodiment wherein the loop holder 25 is formed as a single piece having a polygonal, loop-receiving passage 26 therein and a relatively shallow passage 27 extending from and along the length of passage 26 to the outside of such loop holder.

A loop 28a of flexible strip material 28 to be held is inserted in passage 26, with open end portions thereof emerging through passage 27. A polygonal loop-expanding element 29 is inserted into the loop either before or after positioning of the latter in passage 26. Again, it is important that both passage 26 and element 29 be configurated and of size precluding rotation of element 29 within the passage. The material holding action of the device is as described above, and a lug 30 with cord-receiving hole 31 provides a similar convenient means for anchoring the holding device.

Whereas the invention is here described in detail with reference to a presently preferred specific embodiment, it should be realized that various changes may be made without departing from the disclosed inventive concepts.

I claim:

1. A device for holding flexible sheet or strip material, comprising a loop holder formed by clamping jaws disposed in face-to-face relationship and having confronting faces configurated to provide a polygonal passage therebetween for the reception of a loop portion of flexible sheet or strip material to be held and of a loop-expanding element; jaw face portions adjacent to and at one end of the polygonal passage adapted to define therebetween a relatively shallow passage for said sheet or strip material when the clamping jaws are opened, said passage accommodating emergent portions of a received loop portion of flexible sheet or strip material to be held; means for applying clamping pressure to the clamping jaws of the loop holder; and a rigid, polygonal, loop-expanding element of size adapted to be non-rotatively accommodated by said polygonal passage and adapted for positioning within a loop portion of flexible sheet or strip material to be held that is positioned within said polygonal passage.

2. A device according to claim 1, wherein the loop-expanding element is less in thickness than the depth of the polygonal passage which receives it, and the clamping jaws are adapted to clamp together about the emergent portions of the material to be held.

3. A device according to claim 1, wherein the thickness of the loop-expanding element is substantially equal to the depth of the polygonal passage which receives it, and the clamping jaws are adapted to clamp together about both the emergent portions of the material to be held and the insert element.

4. A device according to claim 1, wherein the thickness of the loop-expanding element is greater than the depth of the polygonal passage which receives it, and the clamping jaws are adapted to clamp about the insert element.

5. A device according to claim 1, wherein the means for applying clamping pressure comprises a thumbscrew operably associated with the clamping jaws.

6. A device according to claim 1, wherein the clamping jaws include a first jaw member configurated to provide jaw face portions adjacent opposite sides of a recess portion and a second jaw member having a substantially flat confronting surface adapted to extend between the face portions of the first member and over the recess portion thereof to create a polygonal passage therebetween; and the means for applying clamping pressure includes a thumbscrew extending through the second jaw member into one jaw face of the first jaw member.

7. A device according to claim 6, wherein the first jaw member includes means for attaching a rope or cord thereto, and cushioning means attached to the side opposite the side confronting the second jaw member.

8. A device according to claim 1, wherein the polygonal passage is rectangular and the loop-expanding element is rectangular.

9. A method of holding flexible sheet or strip material, comprising the steps of forming a loop in the material to be held, said loop having a closed and an open end; inserting the closed end of the loop into the polygonal receiving passage of the loop holder of a holding device conforming to claim 1 so that emergent portions of said material extend through the relatively shallow passage provided therefor; and inserting the polygonal, loop-expanding element of said device into said loop of the material that is within the polygonal passage.

* * * * *